S. H. MICHEL.
FUNNEL.
APPLICATION FILED NOV. 30, 1910.
986,301.
Patented Mar. 7, 1911.
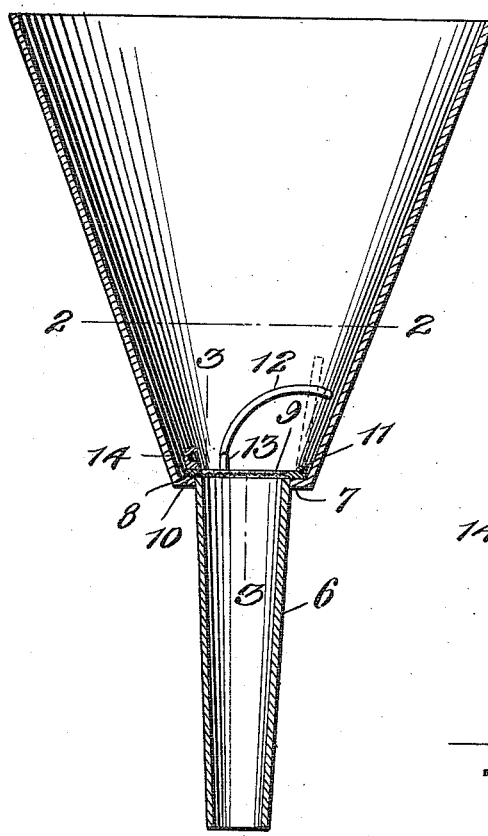
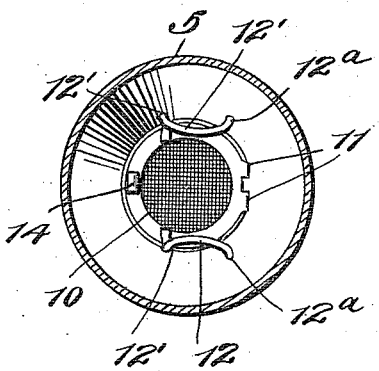
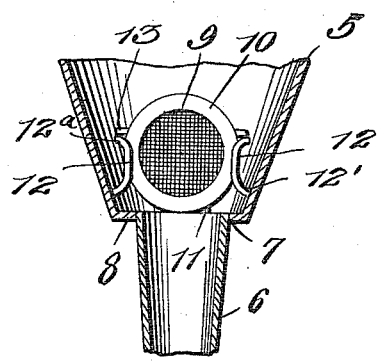
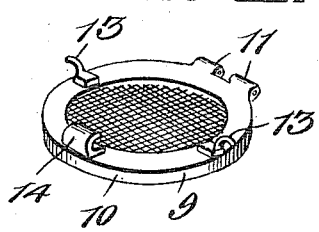
Inventor
S. H. Michel,
Witnesses
By Watson E. Coleman
Attorney

UNITED STATES PATENT OFFICE.

SAMUEL H. MICHEL, OF TIPTON, INDIANA.

FUNNEL.

986,301.

Specification of Letters Patent. Patented Mar. 7, 1911.

Application filed November 30, 1910. Serial No. 594,949.

*To all whom it may concern:*

Be it known that I, SAMUEL H. MICHEL, a citizen of the United States, residing at Tipton, in the county of Tipton and State of Indiana, have invented certain new and useful Improvements in Funnels, of which the following is a specification, reference being had to the accompanying drawings.

This invention relates to an improved funnel and has for its object to provide a funnel having a strainer adjustably mounted therein, and means arranged in the funnel for yieldingly supporting the strainer in an elevated position when it is not desired to use the same.

A further object of the invention resides in the provision of a straining or filtering funnel of very novel construction which is especially adapted for the straining of gasolene but which may also be used in the pouring of liquids of greater consistency.

A still further object of the invention is to provide a funnel having a reticulated strainer hingedly arranged therein and adapted to be seated upon a shoulder formed in the funnel, and resilient rods to be engaged by means carried by the strainer to hold said strainer in an inoperative position.

Still another object of the invention is to provide a device of the above specified character which is comparatively simple in construction, highly efficient and durable in practical use and one which may be manufactured at a very low cost.

With the above and other objects in view, the invention consists of the novel features of construction, combination and arrangement of parts hereinafter fully described and claimed, and illustrated in the accompanying drawings, in which—

Figure 1 is a vertical section through a funnel embodying my improvements, showing the straining or filtering elements disposed in its inoperative position in dotted lines; Fig. 2 is a section taken on the line 2—2 of Fig. 1; Fig. 3 is a section taken on the line 3—3 of Fig. 1, the strainer being shown in its elevated position; and Fig. 4 is a detail perspective view of the strainer removed from the funnel.

Referring in detail to the drawing 5 designates the upper or body part of my improved funnel while 6, indicates the tubular neck or spout portion which is adapted to be inserted into the opening of the receptacle or container in which the liquid is poured. These parts 5 and 6 of the funnel are soldered or otherwise rigidly secured together at 7, the lower smaller end of the body 5 being flanged to provide a shoulder 8, the purpose of which will shortly be made apparent.

A straining member 9 of wire gauze or other reticulated material is movably arranged in the lower end of the body portion 5 of the funnel. The edge of this strainer is provided with a metal reinforcement 10 and upon this reinforcement the hinge knuckles 11 are formed whereby said straining member is adapted to be hingedly mounted upon the shoulder 8 of the funnel upon which similar hinge knuckles are provided. To the body 5 of the funnel at its lower end and at opposite points the spring rods 12 are secured. These rods are bent to describe an arc which is concentric with the hinged point of the straining element 9, and the lower ends of said rods are slightly bent outwardly as indicated at 12′ in Fig. 3, the walls of the body 5 of the funnel diverging from the lower ends of said rods. The upper ends of the rods 12 are also slightly bent or curved as indicated at 12$^a$ and are adapted to support the straining element 9 when the same is elevated to its inoperative position. The strainer 9 carries the lugs 13 which are arranged upon the reinforced edge thereof at one side of the center of the strainer, said lugs being disposed at opposite points and slightly curved upwardly as shown in Fig. 4. These lugs 13 are so located that they engage with the resilient rods 12 in the movement of the strainer and force said rods outwardly in opposite directions. Thus when the straining element 9 is raised to the position shown in dotted lines in Fig. 1, the rods 12 spring inwardly when the lugs 13 have been moved beyond the ends thereof, and engage beneath said lugs, whereby the strainer is yieldingly held in its elevated position. Liquids may now be poured through the funnel without straining or filtering the same.

In the use of my improved funnel for filtering purposes, the user forces the straining element 9 downwardly between the rods 12 until the lugs 13 are moved below the outwardly curved portions 12′ at the lower ends of the rods. The strainer will then be seated upon the shoulder 8 of the funnel and the rods 12 spring outwardly over the lugs 13 and effectually hold the strainer in position so that the fluid which is poured into the funnel passes through the reticulated material of which the strainer is formed. The straining element 9 is preferably provided at a point opposite the hinge thereof with a finger-piece 14 by means of which the strainer may be easily and conveniently elevated.

From the foregoing it is thought that the construction and manner of use of my improved straining or filtering funnel will be readily understood. The device is comparatively simple in its construction and eliminates the necessity of providing two funnels, one to be used for straining purposes and the other in the pouring of liquids of greater consistency, which it is not desired to strain. While the funnel is particularly designed for use in the straining of gasolene, it will be understood that it may also be employed in refining various other liquids. As but few elements are utilized in the construction of the funnel and they are of very simple construction and may be readily obtained at small cost, it will be obvious that the device can be manufactured and sold at but slightly greater cost than the ordinary funnel and that it will also be extremely durable in practical use. While I have illustrated in the drawing a funnel of the well known conical circular form, it will be obvious that my improved straining or filtering device may be applied to funnels of any desired cross sectional form. The funnel may be conveniently constructed from tin or other sheet metal such as is commonly employed in the manufacture of articles of this character.

While I have shown and described the preferred construction and arrangement of the various parts of the device, it will be understood that the same is susceptible of considerable modification without departing from the essential feature or sacrificing any of the advantages thereof.

Having thus described the invention what is claimed is:—

1. The combination with a funnel, of a strainer hingedly mounted therein and disposed in a horizontal plane when in its operative position, and means arranged within the funnel on opposite sides of the strainer to retain the same in its operative position and also support said strainer in an elevated inoperative position.

2. A funnel comprising two sections rigidly secured together to form a shoulder at their juncture, a reticulated strainer hingedly mounted upon the shoulder and adapted to lie thereon in a horizontal plane when in its operative position, and resilient elements arranged in the funnel at opposite points to yieldingly retain the strainer in its operative position and to support said strainer in an elevated position.

3. A funnel comprising two sections rigidly secured together to form a shoulder at their juncture, a strainer movably mounted on said shoulder and normally disposed in a horizontal plane when in its operative position, spring rods secured at one of their ends to the funnel and extending into the same, and means carried by the strainer to engage said rods and move the same, said rods coacting with the means carried by the strainer to yieldingly hold the strainer in its operative position and to yieldingly support the same in an elevated position.

4. A funnel comprising two sections rigidly secured together to form a shoulder at their juncture, a strainer hinged upon said shoulder and normally disposed in a horizontal plane thereon when in its operative position, spring rods secured at their lower ends in the walls of the funnel, lugs carried by the strainer to engage said rods in the movement of the strainer, the upper free ends of the rods being curved and adapted to engage said lugs to support the strainer in an elevated position, said rods being disposed over said lugs in the operative position of the strainer to yieldingly hold the same upon said shoulder.

5. A funnel having an interior shoulder, a strainer hingedly mounted upon said shoulder and supported by the same in a horizontal plane when in its operative position, spring rods curved in concentric relation to the hinged point of the strainer, the ends of said rods being curved, the lower ends thereof being fixed in the walls of the funnel, and upwardly curved lugs secured to the edge of the strainer at opposite points for engagement with the curved rods, said lugs engaging the upper free ends of the rods whereby the strainer is supported in an elevated inoperative position, said lugs being disposed beneath the lower curved end portions of the rods in the operative position of the strainer to yieldingly hold the strainer upon said shoulder.

In testimony whereof I hereunto affix my signature in the presence of two witnesses.

SAMUEL H. MICHEL.

Witnesses:
  PETER MICHEL,
  EDWARD MICHEL.